Aug. 26, 1930.   A. H. NEULAND   1,773,843

AUTOMATIC POWER TRANSMISSION

Filed Sept. 13, 1927

INVENTOR
Alfons H. Neuland
BY
Victor D. Borst
ATTORNEY

Patented Aug. 26, 1930

1,773,843

UNITED STATES PATENT OFFICE

ALFONS H. NEULAND, OF IRVINGTON, NEW JERSEY, ASSIGNOR TO ELECTRO-MOBILE CORPORATION, OF IRVINGTON, NEW JERSEY

AUTOMATIC POWER TRANSMISSION  REISSUED

Application filed September 13, 1927. Serial No. 219,226.

My present invention relates to power transmissions and particularly to a method and apparatus for the transmission of power from a prime mover such as an internal combustion engine to a load as in motor vehicles, elevators, Diesel locomotives and the like.

One object of my invention is to produce an automatic change in torque and speed between prime mover and load as the speed and torque requirement of the load vary.

Another object is to provide an apparatus in which the load shaft is capable of developing a torque and speed exceeding that delivered by the prime mover.

Another object is to produce a self-exciting apparatus of such type which is free from surging and reversal of polarity and in which the action is smooth particularly at start and during the period of transition from underspeeding to overspeeding and the torque upon the load uninterrupted and free from shock over the entire speed range.

Other objects are to decelerate the load by the aid of engine friction, to start the prime mover from rest and to adjust the rate of automatic change.

Still other objects will appear from the following description.

Briefly outlined I transmit a torque from a prime mover to a load through a clutch dynamo or other transmitting device capable of operating at a speed difference. I also provide means such as a dynamo or other corresponding boosting or translating device which is connected to prime mover and capable to deliver to or receive power from the prime mover. I further provide means for interconnecting the transmitting and boosting devices in such a way that power may flow therebetween in either direction according to whether the load speed is lower or higher than the prime mover speed. In addition I provide a source of excitation or a regulator actuated by the speed of rotation of prime mover and the torque requirement of the load which comprises a small dynamo or other current source if the apparatus is of electrical type or other suitable mechanism to correspond with the particular medium employed.

Hereafter I shall refer to my invention as embodied in an electrical apparatus which I have selected for illustration. This I shall now describe and thereafter point out my invention in claims.

Figure 1:
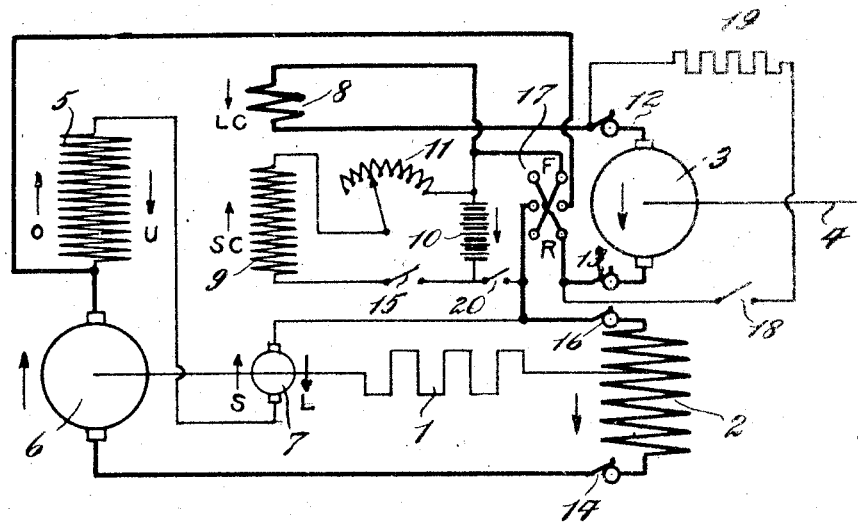
Fig. 1 is a diagram of the electric circuit connections.
Figure 2:
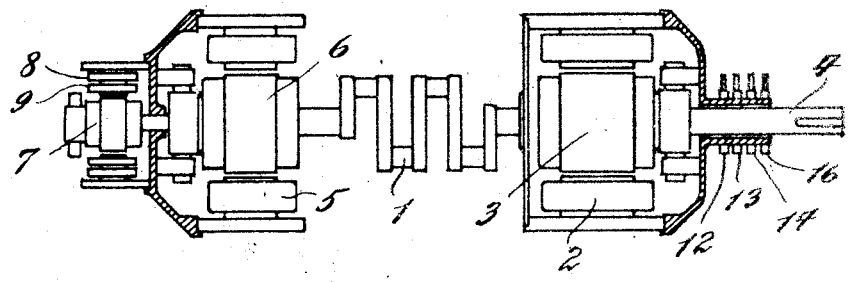
Fig. 2 is one form for the mechanical arrangement of parts.

Referring to Fig. 1 and Fig. 2 the prime mover or power source is represented by the crankshaft 1 which drives the series coil 2 mounted on the field system of the clutch dynamo. The clutch armature 3 drives the load shaft 4. The booster dynamo includes a shunt coil 5 carried by the stationary field system and an armature 6 mechanically connected to the crank shaft or power source 1.

In addition a small regulating dynamo is provided having its armature 7 also mechanically connected to the prime mover shaft 1. Its field winding consists of two coils a series coil 8 traversed by the main load current and a shunt coil 9 supplied with current from a battery 10 through the ratio changer rheostat 11. Slip rings 12, 13, 14 and 16 serve the purpose of interconnecting the rotating clutch terminals with the stationary terminals. The load current in its course through the main circuit traverses the clutch armature 3, series clutch field 2, booster armature 6, regulator series coil 8 back to armature 3. The booster field coil 5 is connected across the armatures 3 and 6 and is supplied with current from clutch armature 3 in the direction shown by arrow U when load shaft 4 is underspeeding prime mover 1 and is supplied by current from booster armature 6 in the direction shown by arrow O when load shaft 4 is overspeeding prime mover 1. It is seen that the direction of current through the coil automatically reverses every time the load shaft changes from underrunning to overrunning or vice versa. For the purpose hereafter more fully explained, the regulator armature 7 is included in the circuit of the shunt coil 5 in order to effect a further change in strength or direction of the current therein according to the speed and load condition of the load shaft 4. The regulator coils 8 and 9 are so proportioned with relation to one another that on maximum or heavy loads the direction of regulator field flux is determined by the heavy current in and M. M. F. due to coil 8 which predominates over that due to coil 9 and causes the potential generated in regulator armature 7 to have direction indicated by arrow L. When load is light, M. M. F. in coil 9 predominates, reverses regulator flux and armature potential in 7 as shown by arrow S.

In operation, closing of switch 15 energizes coil 9. With the load shaft 4 stationary, rotation of prime mover shaft 1 generates current in clutch armature 3 which traverses clutch field 2, booster armature 6, regulator coil 8 returning to armature 3. This causes the rotating field 2 to transfer a torque to the armature 3 and the load shaft 4. A relatively small portion of current from armature 3 passes through slip ring 13 through regulator armature 7 and booster coil 5 then through coil 8 back to armature 3.

The direction of current at this moment in booster coil 5 is as shown by arrow U producing a motoring field flux so that the armature 6 assists in rotating the prime mover shaft 1. The booster motoring flux is further increased by the generation of potential in regulator armature 7 having direction shown by arrow L due to predominating M. M. F. in coil 8 at this time which overpowers that due to coil 9. In this way the differential energy from the clutch flows into the booster and returns to its source 1 so that the load is supplied with torque from two sources, the prime mover and the booster. As the load shaft 4 begins to rotate the speed difference between clutch field and armature diminishes as does the potential of clutch armature 3. This reduces the current in booster coil 5, a further reduction being brought about by the lessened potential in armature 7 due to decreasing load current in coil 8. Consequently as the speed of load shaft continues to increase the motoring action of booster continues to decrease until when the clutch armature speed approaches that of clutch field practically the entire prime mover energy is directly transferred from shaft 1 to the load by way of the clutch.

The clutch armature potential and current in coil 5 have practically ceased since the continually decreasing load current in coil 8 and the M. M. F. due thereto have been neutralized by that due to coil 9; the regulator field flux has ceased and armature 7 generates no potential.

A further increase in load speed causes load current in coil 8 to decrease to the point where the M. M. F in coil 9 starts to predominate and to reverse flux through regulator armature 7 generating a reversed potential shown by arrow S which now supplies the booster coil 5 with current in reverse direction shown by arrow O also reversing the booster field flux and causing the booster armature to become a generator and increasingly supply the energizing current to the system thus enabling the load shaft armature 3 to pass through synchronism with relation to the prime mover while carrying its full load. The load speed continues to increase beyond that of the driver or shaft 1 as the generated potential in the booster armature 6 increases since the booster armature potential now also helps to force current through coil 5 further increasing the booster flux and potential and causing the load shaft 4 greatly to overspeed the prime mover. At this stage a portion of the engine torque and energy is directly transferred to the clutch, the balance is delivered to the booster and is changed into electrical energy which then flows into the clutch supplying it with the overspeed power component.

The system also provides for automatic change in the speed and torque relationship between prime mover and load shaft as the load torque requirement varies. For instance when underspeeding on light load the current in coil 8 is also light so that coil 9 reverses the regulator flux and establishes potential direction S in armature 7 which opposes potential from armature 3, reduces current in coil 5 and therefore the booster motoring action. This causes the prime mover to slow down or if its speed be fixed, causes the load speed to increase.

Under the condition when load shaft 4 overspeeds prime mover 1, coil 5 receives its current from booster armature 6 having direction indicated by arrow O which is supplemented by regulator armature 7 generating potential of direction S which is greater on light load as the lesser opposing current in coil 8 permits a greater flux due to coil 9 and consequently a stronger current in coil 5 and increased booster flux and potential in armature 6 which again causes the load to speed up or the prime mover to slow down. This feature is desirable when the system is used in connection with motor vehicles where on light loads an automatic slowing down of engine results in economy.

The ratio changer or rheostat 11 permits a manual adjustment of the torque speed relationship between prime mover and load and is of utility when an internal combustion engine serving as a prime mover loses compression and torque. An increase of the resistance 11 will decrease current in coil 9 facilitating opposition from coil 8 which changes the current value in booster coil 5 and therefore booster action and results in a higher engine speed which then produces the required torque at load shaft 4 as heretofore explained.

From the foregoing it is seen that while the booster coil is self-excited from either armature 3 or 6 the inclusion of the regulator in the exciting circuit is important in that it permits a greater maximum torque at start, it enables the load armature to pass through synchronism while carrying full load, it permits a higher load speed and causes an automatic change or a slowing down of prime mover at light load, it insures smooth action at all times. It also prevents current reversal in main circuit and surging when underspeeding in instances where a load torque must be produced which greatly exceeds that of prime mover as any sudden decrease or cessation of current in main circuit lessens or stops opposition due to coil 8. This instantly establishes in armature 7 a potential of direction S which immediately opposes potential of direction U in coil 5 or even overpowers and reverses current in 5 to direction O causing booster armature 6 to become generator and maintain the current direction and equilibrium of the main circuit.

The load shaft 4 may be operated in reverse direction by throwing the double throw switch 17 over from position F to the position R reversing the clutch armature terminals. This causes the booster to immediately assume the function of a shunt generator forcing a current through the armature 3 in reverse direction, causing it to rotate backwards and using the field as a fulcrum which thereby is impelled in the direction of engine rotation and caused to exert an additional torque upon the shaft 1. The booster armature is in this instance supplied with torque from two sources, that is from the prime mover direct and from the clutch field. In order that the booster generator may absorb the sum of the torques its field must be strong. This condition is helped by the regulator armature 7 which generates a strong potential of direction S because current in coil 8 has been reversed aiding coil 9 in the production of a strong flux. In instances where a powerful reverse torque must be produced the size of booster may equal or even exceed that of the clutch.

The load is decelerated by closing the switch 18 through a resistance 19.

The booster armature immediately has a current generated in it which flows through coil 8, resistance 19 switch 18 and clutch field coil 2 energizing it. The current in the overrunning armature 3 reverses, joins the booster current through the resistance 19 and through the switch 18 returns to the other terminal of armature. The load now drives the clutch field, shaft 1 and armature 6 the energy being absorbed partly by engine friction and partly by the resistance 19. It will be seen that when the booster load current traversing coil 8 reaches a high value, the regulator flux reverses, armature 7 generates potential of direction L opposing that due armature 6 and limiting the field current in coil 5 and consequently booster torque reaction and so prevents shock to the system.

The apparatus is capable of starting the engine or prime mover. When switch 20 is closed current from battery 10 flows through slip ring 16, clutch field 2 armature 6 back to battery. Current from battery also flows through slip ring 13, armature 3 and coil 8 in reverse direction producing a forward torque on prime mover shaft 1. Current also flows from battery through regulator armature 7 and booster coil 5 in the direction of arrow U producing motor action and assisting in starting the engine 1. The current directions in armature 7 and coils 8 and 9 are also such as to add to the starting torque.

Claims:

1. In combination an engine, a load shaft, a unidirectionally rotating booster dynamo having a field winding, a reversible second dynamo electrically connected with the first dynamo and cooperating therewith for transmitting power from engine to load shaft, means including the winding for magnetizing the booster field from the reversible dynamo for relative rotation of its elements in one direction and from the first dynamo for relative rotation in the opposite direction, and a source of potential in circuit with the booster field winding adapted to magnetize the booster field and to maintain power flow between engine and load during the reversal period.

2. In combination, an engine, a load shaft, a reversible clutch dynamo interposed between engine and load shaft, a unidirectionally rotating booster dynamo having its armature operatively connected to engine and electrically connected to the clutch dynamo and provided with shunt field coils adapted to receive current from the clutch dynamo during relative rotation of its elements in one direction and to receive current from the armature of the booster dynamo in reverse direction during relative rotation in the opposite direction, and a regulating dynamo having its armature operatively connected to engine and adapted to supply the shunt field coils with current during the reversal period.

3. In combination an engine, a load shaft, a reversible clutch dynamo having one of its elements connected to engine and the other to the load shaft, a unidirectionally rotating booster dynamo having its armature mechanically connected to engine and electrically connected to the clutch dynamo and provided with shunt coils, a regulator having an armature, a regulating circuit including regulator armature shunt coils and booster armature, means for driving the regulator armature in accordance with the engine speed and means for varying the engine speed, operative to reverse the current in the shunt coils and to reverse the relative rotation of the clutch elements.

4. The means for automatically accelerating a load shaft which includes a power shaft, a load shaft, a dynamo rotatively connected to one of the shafts having a field member and a shunt field coil, a second dynamo rotatively connected with both shafts having armature and field elements, a load circuit including the dynamos, an exciting circuit including the shunt field coil adapted to magnetize the field member from the armature of second dynamo in motoring direction for relative rotation of one element with respect to the other in a given direction in the first stage of acceleration, a rotatable regulating dynamo adapted to oppose the current in the exciting circuit, and means for varying the speed of the regulating dynamo adapted to reverse current in the exciting circuit and to reverse relative rotation of one element with respect to the other in the second stage of acceleration.

5. In combination, a power shaft, a load shaft, a dynamo rotatively connected with one of the shafts having a field member, a second dynamo rotatively connected to both shafts having armature and field elements, a load circuit including both dynamos, means for magnetizing the field member from the second dynamo for relative rotation of one element with respect to the other in one direction and from the first dynamo for relative rotation in the other direction, and a source of current adapted to magnetize the field member during the reversal period.

6. In combination, an engine shaft, a load shaft, a unidirectionally rotating dynamo having a field member and a field coil, a reversible second dynamo having armature and field elements electrically connected with the first dynamo and cooperating therewith for transmitting power from engine shaft to load shaft, means including the field coil for magnetizing the field member from the armature of the reversible dynamo for relative rotation of one of its elements with respect to the other in one direction and from the first dynamo for relative rotation in the opposite direction, a source of potential in circuit with the field coil adapted to magnetize the field element and to maintain power flow between engine shaft and load shaft during the reversal period, and means for varying the potential of the source operative to reverse current in shunt coil and to reverse the relative rotation of one element with respect to the other.

7. The means for stabilizing an electric system which includes an engine shaft, a load shaft, a dynamo rotatively connected to one of the shafts having a shunt field coil, a second dynamo rotatively connected to both shafts and electrically connected to the first dynamo, a load circuit including the dynamos, a rotatable regulating dynamo, an exciting circuit including the regulating dynamo and shunt field coil adapted to supply the shunt field coil with current from second dynamo in one direction when current flows in load circuit and to supply the shunt field coils with current from the regulating dynamo in the opposite direction when load current ceases.

8. In combination, a unidirectionally rotating engine shaft, a reversible load shaft, a dynamo rotatively connected to the engine shaft having a field coil, a second dynamo electrically connected to the first dynamo and having armature and field elements, a regulating dynamo, an exciting circuit including the field coil and regulating dynamo, and a reversing switch for one of the elements of the second dynamo adapted when in one position to supply the field coil with current from second dynamo in one direction for forward operation of load shaft and when in the other position to supply field coil with current from first dynamo in the other direction for reverse operation of load shaft.

9. In combination an engine having an engine shaft, a load shaft, a dynamo rotatively connected with both shafts having a series field coil, a second dynamo rotatively connected with one of the shafts, a load circuit including the dynamos adapted to establish power flow from engine shaft to load shaft, a battery, and a switch adapted when closed to connect battery to the first dynamo to form one circuit and to establish a second circuit including the second dynamo and the series coil operative to rotate engine shaft, and to weaken current in series coil as engine shaft speeds up.

10. In combination, an engine shaft, a load shaft, a dynamo rotatively connected with both shafts, a second dynamo rotatively connected to one of the shafts having a field coil, means for impressing a potential on the field coil in one direction, means for impressing a second potential on the field coil in the opposite direction, and means for varying one potential with respect to the other operative to reverse the current in the field coil.

In witness whereof, I hereunto subscribe my signature.

ALFONS H. NEULAND.